Oct. 10, 1944.   J. H. BALTHIS ET AL   2,360,097
APPARATUS FOR MANUFACTURE OF COATED PRODUCTS
Original Filed March 21, 1940    2 Sheets-Sheet 1
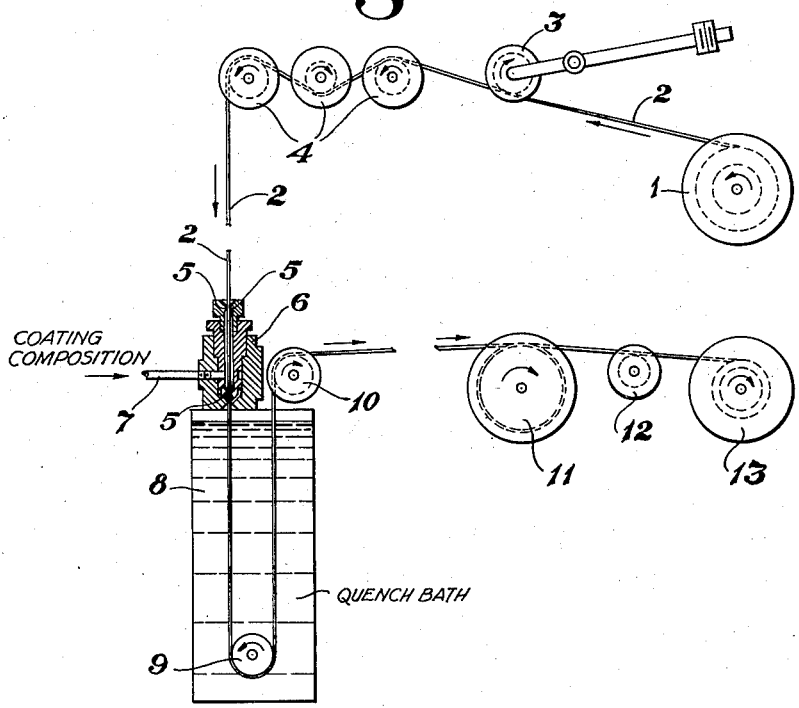
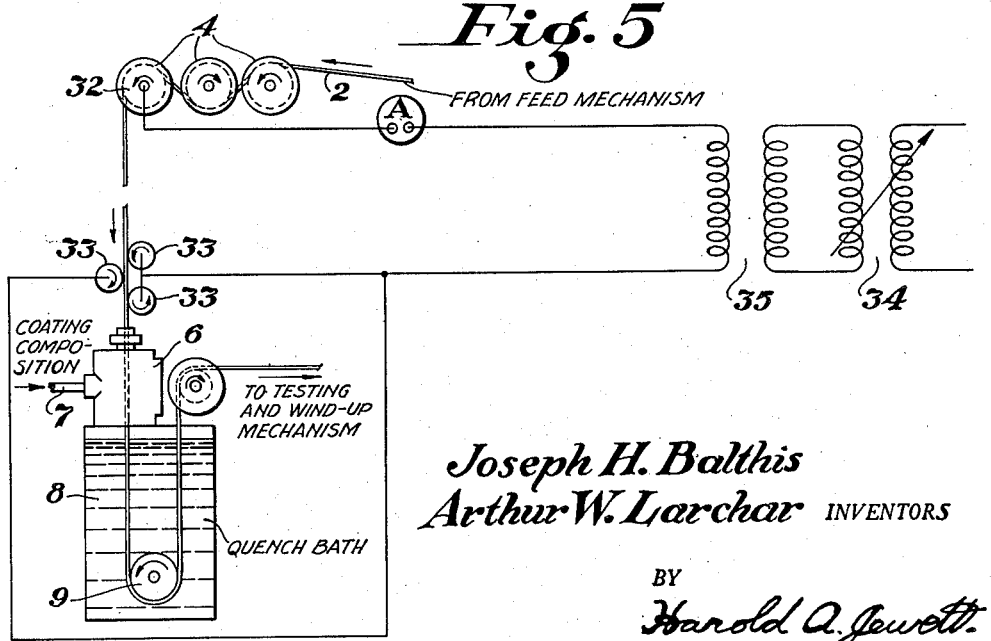
Joseph H. Balthis
Arthur W. Larchar  INVENTORS
BY
Harold A. Jewett
ATTORNEY Oct. 10, 1944. J. H. BALTHIS ET AL 2,360,097
APPARATUS FOR MANUFACTURE OF COATED PRODUCTS
Original Filed March 21, 1940 2 Sheets-Sheet 2
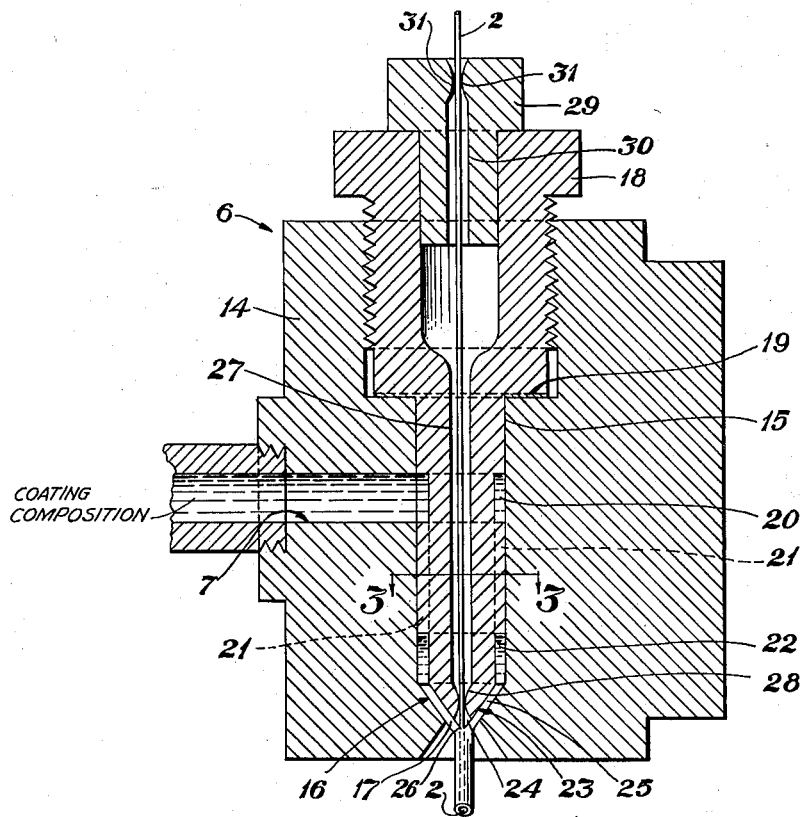
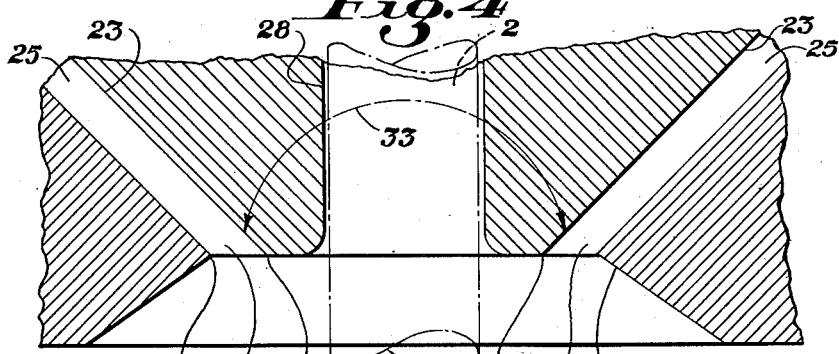
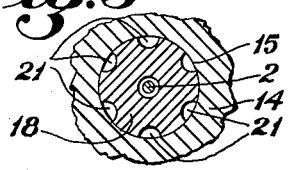
Joseph H. Balthis
Arthur W. Larchar
INVENTORS
BY
Harold A. Jewett
ATTORNEY Patented Oct. 10, 1944

2,360,097

UNITED STATES PATENT OFFICE 2,360,097

APPARATUS FOR MANUFACTURE OF COATED PRODUCTS

Joseph H. Balthis, Wilmington, Del., and Arthur W. Larchar, Mendenhall, Pa., assignors to E. I. du Pont de Nemours & Company, Wilmington, Del., a corporation of Delaware Original application March 21, 1940, Serial No. 325,230. Divided and this application July 1, 1942, Serial No. 449,282

5 Claims. (Cl. 91—43)

This application is a division of application Serial No. 325,230, now U. S. Patent 2,308,638, filed March 21, 1940 and assigned to the assignee hereof.

The invention relates to the manufacture of coated articles and particularly to novel processes and apparatus for applying a coating of electrically insulating material to wire.

Heretofore coating materials have been applied to wire in a number of ways. One method consists in drawing the wire through a solution of the material and then removing the solvent by heating the residual deposit. Another method consists in passing the wire through the molten or plastic material, and finally conducting the wire with an excess of the material adhering to it, through a shaping orifice which scrapes the excess off the wire, as for instance a circular doctor blade, and thus leaves it with an overall cross-section approximately equal to that of the orifice. Another method, which has been described as applicable in the case of polystyrene, consists in passing plastic polymer through an annular orifice, while concomitantly stretching it out in such a manner that its flexibility is increased by the stretching and reduction in diameter which it undergoes, the said reduction in diameter also causing it to fit around a wire which passes concentrically through the said orifice axially of the said stretched polystyrene, and synchronously therewith.

The first of the above stated procedures has the disadvantage that the solvent removal step is time consuming and costly and in that it is difficult to produce coats of satisfactory thickness and freedom from pin holes. Furthermore, the process does not lend itself to the application of certain insulating coatings, e. g., polyhexamethylene adipamide, which are not soluble in readily volatile non-corrosive solvents.

In the second above stated procedure, wherein the wire laden with coating material passes through an orifice whose diameter is substantially equal to that of the wire as finally coated, thick coverings of thermoplastic materials such as rubber and polyvinyl chloride generally are applied, and accurate centering of the wire becomes increasingly important as well as increasingly difficult when it is attempted to reduce the thickness of the coating. In fact, with this procedure, so far as applicants are aware, it heretofore has proved impossible to extrude on wire uniform continuous concentric coats of thickness below about 0.004 inch. Furthermore, the practical range of coating thicknesses producible by the said procedure with a given orifice is very small, being limited essentially to the radial tolerance of the orifice with respect to the bare wire.

In the third above stated procedure, that of flexibilizing polystyrene insulation as it is applied to wire, it is necessary, in order to accomplish the desired drawing or stretching, that considerable distance intervene between the orifice and the point at which the polystyrene finally contacts the wire. Use of a coating material which at the instant of contacting the wire is in such a state that it may be roughened by vibration thereof, consequently is not feasible in this process, since such roughening increases in proportion to the said distance. Moreover, the process is not operative with truly molten material, since a liquid, even if it be maintained throughout at a temperature only slightly above its solidifying point, is not responsive to the said stretching.

In attempting to overcome the disadvantages of the foregoing methods applicants have conducted exhaustive researches with various materials and compositions, but most notably with the highly polymeric compounds typified by the fiber-forming synthetic linear polymers and polyamides described in U. S. Patents 2,071,250; 2,071,253 and 2,130,948. These polymers, also referred to as superpolymers, differ widely from thermoplastic materials, for instance, in that they characteristically melt sharply by reason of their crystalline nature, whereas thermoplastic materials soften gradually over wide temperature ranges. When molten, these synthetic linear polymers behave like true liquids, i. e., they exhibit Newtonic rather than plastic flow. Also, the said polymers possess outstanding flexibility, toughness and abrasion resistance, are highly immune from chemical attack by substances with which electrical insulation is apt to be contacted, as for instance, chlorinated hydrocarbons in transformers, or the usual compounds employed as refrigerants, and in numerous other respects are very suitable for use as insulation for electrical conductors. This invention involves particularly, therefore, the production of electrical conductors bearing relatively thin coatings of the said polymers, and will be presented particularly in connection therewith. The invention is not to be limited thereto, however, since it is applicable for the solution of problems presented by other filamentary objects or cores or other coating operations or materials, whenever and wherever there is pertinent identity or analogy between the respective objects, materials, operations, and problems.

One of the principal obstacles that has been overcome by this invention, especially in respect of the said polymers, is illustrated by their tendency toward bubble formation on being kept for any appreciable time in the molten condition. This difficulty becomes particularly acute when the pressure on the molten polymer is reduced, e. g. from superatmospheric to atmospheric pressure, as it is in extrusion coating processes. Being essentially non-thermoplastic, as hereinabove explained, the polymers must be melted prior to extrusion, and in most cases very high temperatures must be employed to accomplish this end. The result is that gases tend to be formed, especially where the melting has been accomplished in a gaseous atmosphere and under pressure exerted by melt-extrusion mechanism. The characteristic formation of bubbles of gas which follows subsequent exposure of the polymers while still molten, to lower pressures, appears due both to some degree of thermal decomposition of the polymer and to release of gas which was forced into solution by the said pressure. Or there may be other and unknown causes. In any event, the problem of eliminating such bubble formation is one that must be solved. A particular aspect of the importance of this problem becomes apparent when it is considered that the dielectric strength of coatings containing bubbles of gases is very materially less than that of similar coatings in a bubble-free condition.

The problem of controlling the degree of adherence or non-removability of the coatings also presented serious difficulties, especially in connection with the problem of bubble prevention.

One of the greatest obstacles to success consisted in the above-stated fact that it was necessary for extrusion coating with the polymers, not only to heat them above their melting points, generally upwards of 250° C., but to maintain them in the molten condition until after their application to the object to be coated.

Dealing with such polymers at such temperatures, and in their liquid state, especially at the high speeds of operation desirable for economy of operation, and the production of thin coatings of, say, as low as 0.001 to 0.004 inch in thickness, entailed many difficulties and gave rise to many problems not heretofore known to the art.

This invention has as an object, therefore, the solution of the said difficulties and problems, and the achievement of the objectives indicated hereinabove and hereinafter.

More specifically, this invention has among its objects:

The provision of smooth, continuous, thin coatings of uniform thickness (i. e. good centering) on filamentary objects, or cores, particularly wire and stranded wires;

The provision of such coatings ranging in thickness from approximately 0.0005 inch to approximately 0.006 inch or higher;

The provision of such coatings on objects with surfaces comprising materials of either a metallic or non-metallic, organic or inorganic, heat resistant or heat-decomposable, fibrous or non-fibrous, hard or soft, or adhesive or non-adhesive nature;

The provision of electrically insulated conductors, of coatings upon pre-insulated conductors, and of coated conduits and the like;

The production of such coatings in a substantially bubble-free state;

The production of such coatings having a predetermined degree of adherence or non-adherence to the object; and The provision of processes and apparatus for the accomplishment of any and all of the objectives stated hereinbefore or hereinafter.

The objects of this invention are accomplished by maintaining a supply of molten coating composition, preferably a synthetic linear superpolyamide or analogous material, under confinement and under sufficient pressure to prevent the existence of bubbles therein, forcing the said molten material at a uniform rate and in the form of an inwardly converging radial stream concentrically about the core to be coated, while the core is moving at a uniform rate in the direction of its longitudinal axis, in such manner and under such conditions that the coating composition shall have at the instant of application to the core, opportunity free from restraint by any external structure, to encompass the core uniformly and smoothly, cooling the said material so deposited to a state of congealment before reduction of the said pressure has given rise to appreciable bubble formation, or the surface of the core has been damaged by heat, and predetermining the degree of adherence or removability of the coating by appropriately controlling the initial temperature of the core, the moment of congealment of the polymer, and the interval of time between reduction of pressure to bubble-forming range and congealment.

The novel aspects of the invention will be particularized further in the claims appended hereto. A preferred embodiment of apparatus appropriate for use in the practice of the invention will now be set forth, however, followed by details of procedure and illustrative examples showing the successful carrying out of the invention.

Fig. 1 is a side elevation showing a feed roll, straightening pulleys, an extrusion head, a quench bath and several appurtenances to the same.

Fig. 2 is a sectional view of an extrusion head.

Fig. 3 is a cross-section of the principal wire guide containing member on the line 3—3 of Fig. 2.

Fig. 4 is a greatly over-size side elevation, drawn to a scale of 50″ to 1″ of the mouth of the extrusion head and the wire described in Example VI.

Fig. 5 is a side elevation showing the incorporation into the apparatus shown in Fig. 1, of a variable source of electric current, and pulley electrodes for connecting the said source in circuit with the wire, to pre-heat the latter.

Referring to Fig. 1 particularly: 1 is a feed reel from which wire 2 is supplied. An adjustable tension device 3 guides the wire over straightening pulleys 4 and through guides 5 in extrusion head 6, which will be described in detail in the next paragraph. Melted polymer is fed under pressure through channel 7 to the extrusion head, advantageously by means which, though not shown, comprise one or more gear pumps. The polymer, while still in the molten state, issues from the exit end of the extrusion head, whose temperature is maintained at an appropriate level by heating means which likewise are not shown, and forms a coating on the wire 2. The wire thus coated, passes into quench bath 8, around pulleys 9 and 10 through a conventional neon light continuity testing device, which is not shown, to capstan 11, and finally, acted upon by traversing mechanism 12, is wound up on reel 13. The wire can be drawn from the feed reel by the force exerted by the driven wind-up reel, or the feed reel can be power-driven at a speed synchronized with that of the wind-up reel. The latter method reduces variations in tension on the wire.

Referring to Fig. 2 particularly: The body 14 of the aforesaid extrusion head 6 contains a cylindrical longitudinal recess 15 which terminates in a countersunk coned surface 16 having an apertured apex 17, the aforesaid channel 7 leading into said recess 15 at right angles to the longitudinal axis of said body 14. Screwed into said recess 15 is a snugly fitting principal wire guide containing member 18 which is susceptible of longitudinal adjustment by variation of the thickness of the shims 19. This principal wire guide containing member 18 is circumferentially recessed to form a header 20, a plurality of longitudinally disposed channels 21, said channels 21 being shown in cross-sectional detail in Fig. 3, leading from said header 20 to a further circumferential recess 22 in said member 18, which latter recess 22 terminates in a conical surface 23, which itself terminates in an apertured apex 24. Said conical surface 23 is concentrically parallel with and uniformly spaced from the aforesaid countersunk coned surface 16 and forms therewith a conical annular duct 25 and mouth 26.

The aforesaid principal wire guide containing member 18 contains longitudinal recess 27 which, at its point of narrowest diameter 28—the same being located adjacently behind said apex 24—constitutes a principal annular wire guide, which wire guide, as such, also will be denominated 28. The wire entrance end of said recess 27 is enlarged, as shown, to permit insertion of auxiliary wire guide containing member 29, the latter also containing a longitudinal recess 30, which, at its point of narrowest diameter 31, constitutes an auxiliary annular wire guide which, as such, also will be signified by the number 31.

The aforesaid countersunk coned surface 16, header 20, channels 21, recess 22, conical surface 23, apex 24, annular duct 25, mouth 26, and wire guides 28 and 31 all are aligned concentrically about the common longitudinal axis of said extrusion head 6, body 14, principal wire guide containing member 18, auxiliary wire guide containing member 29 and path of wire 2 through said guide; and the location of pulley 9 is adjusted in accordance with said alignment.

Fig. 4 is an enlarged view of the mouthpiece of the extrusion head described in Example VI. The molten coating composition leaves the conical annular duct 25 at the mouth 26. The included angle 33 formed by the surfaces of the conical duct is 90°. The outer edge of the mouth of the conical duct is represented by 36 and the inner edge by 37. These edges are substantially in the same plane as the wire exit end of the principal wire guide 28, although they may be slightly above or below said plane. The wire is represented by 2. The most characteristic features of the mouthpiece are the conical annular duct 25 and the absence of any structure, e. g. a shaping orifice, to confine or support the coating composition after it leaves the conical duct.

Fig. 5 represents the type of assembly used when the wire is preheated. The last of the straightening pulleys 4, referred to hereinabove, is made to serve as an electrode 32. At a point eight or ten feet distant from electrode 32, but close to extrusion head 6, electrode pulley assembly 33 is installed. The pulleys 4, the tension device, and the feed roll are insulated from their supports. Preferably pulley assembly 33 is insulated from its supports. The secondary of a variable transformer 34, fed from a source of current which is not shown, is employed to control the primary of step-down transformer 35, so that the desired degree of preheating of the wire may be achieved when the wire is connected, as shown in said Fig. 5, in circuit with the said source of current. Non-metallic cores also can be preheated prior to coating, e. g. by placing the feed reel in a hot chamber or by passing the core through a heated tube or chamber just prior to its entrance into the extrusion head.

While preferred embodiments of several elements and aspects of the invention are incorporated in the said particular extrusion head and apparatus just described, it is to be understood that the specific structure thereof is in no way limitative of the invention, and that certain variations of or additions to the said structure, as for instance those described hereinafter, are possible without departing from the scope of the invention.

Referring particularly to the mode of operation of the invention, applicants have selected a number of illustrative examples which, by their respective similarities and dissimilarities, will serve to bring into relief several of the more predominant elements of the invention. These examples follow:

EXAMPLE I

In an apparatus such as that shown in Fig. 1 molten polyhexamethylene adipamide, prepared from hexamethylenediamine and adipic acid as described in U. S. 2,130,948, was forced at a constant rate and at a temperature of about 285° C., by means of two gear pumps connected in series, through a filter pack into an extrusion head of the type depicted in Fig. 2. Concurrently, #27 gauge bare round copper wire (diameter 0.014") was led from a reel over tension and straightening pulleys through auxiliary and principal guides located in the extrusion head as shown in Fig. 2. The close-fit sections of the guides had diameters of 0.0156" and the length of the land in the principal guide was about 0.187". The outer annular lip of the discharge mouth of the extrusion annulus had a diameter of 0.060". The width of the annulus, measured on any line intersecting and perpendicular to its conical faces, was 0.0074". The diameter of the cylindrical portion of the guide holder above the conical tip and below the fluted section was 0.187". The tip end of the principal wire guide was 0.007" below the plane of the outer lip of the annular mouthpiece. The extrusion head was maintained at 287–289° C. and polymer was extruded onto the wire at a rate of 6.9 g./min. The wire speed was 102 ft./min. The hot coated wire was passed directly into water about 5" below the extrusion head, and after passing through a drier to remove water, and through a continuity tester, was wound on a reel. The coated wire was smooth and the coating well centered. A portion of the coated wire was immersed in glycerin and examined under a microscope. The ratio of the greatest thickness of the coat to the least thickness, which will be referred to as "centering ratio," was 1.07:1.0. The average coating thickness was 0.0055".

EXAMPLES II–VIII

The pertinent similarities among these examples and the foregoing example may be stated in the following manner.

Polyhexamethylene adipamide, which melts at about 263° C., was used as the coating composition in each example. The batches of polymer used in the various examples had melt viscosities at 285° C. ranging from 550 to 1200 poises. In each example the apparatus was of the type shown in Figs. 1 and 2. The extrusion head temperature was maintained at 285–300° C.

The annular duct from which the polymer was conducted into contact with the wire was conical in shape, as shown in Fig. 4, and in each instance it had an included angle of 90°. Each of the examples in question employed, as the core, bare round copper wire, except Example IV which employed tinned copper wire.

The pertinent dissimilarities among the said examples are set out in Table I.

The coatings showed very good continuity as is apparent from the following tests applied to the products of Examples I–V. In each case the coated wire was passed through a bath of mercury with a direct-current voltage of 220 volts between the wire and the mercury, a lamp being arranged in the circuit to light when a discontinuity in the coat passed through the pool of mercury. The 0.001 inch coating (Example III) showed 5 breaks per 100 ft. of wire, the 0.002 inch coating (Example II) showed 3 breaks, and the 0.0018, 0.005, and 0.0055 inch coatings (Examples V, IV and I) showed no breaks. On the other hand, ordinary enameled wire under the same conditions showed 15 to 30 breaks per 100 ft.

The relative unimportance of precision alignment of the wire in the extrusion head on the centering of the wire within the coating is illustrated in Example VIII. It will be noted that no auxiliary guide was used in this example and that the diameter of the principal wire guide was considerably greater than that of the wire. In spite of the loose fit of the wire in the guide, the "centering ratio" of the coated wire was 1.1 to 1.0. Good centering is obtained even when the guide and line-up pulleys (9 in Fig. 1) are out of line.

Example VII is included in Table I to illustrate our finding that thin, well-centered coats cannot be obtained when the diameter of the outer lip of the duct is small and is placed considerably below the exit end of the principal wire guide. Such a design approaches the shaping orifice type of extrusion head and gives acceptable results only in the application of thick coatings.

The roughness of the thin coatings produced with designs such as that typified in Example VII may be due to disturbances in the flow of the polymer stream, consequent on early cessation of contact between it and the inner surface of the outer wall of the duct, followed by a renewal of such contact, at a substantially non-tangential angle, prior to final issuance of the polymer from the duct. In any event, the wire speed should be maintained at a rate sufficiently low, in relation to the rate of polymer feed, that there shall be no substantial or deleterious intermittency of contact, i. e., cessation of contacting followed by renewal of contacting, between the polymer stream and the inner surface of the outer wall of the duct, during the passage of the polymer through the duct. The type of design exemplified in Figure 4 facilitates the forestalling of such re-contacting, by eliminating the portion of the outer wall against which it is most likely to occur.

*Table I*

| | Variables | Examples | | | | | | | |
|---|---|---|---|---|---|---|---|---|---|
| | | I | II | III | IV | V | VI | VII | VIII |
| 1 | Diameter in inches of auxiliary wire guide, if any | .0156 | .0156 | .0263 | Not used | Not used | .026 | .027 | None |
| 2 | Diameter in inches of principal wire guide | .0156 | .0156 | .0263 | .027 | .0270 | .026 | .027 | .040 |
| 3 | Diameter in inches of flat tip of principal guide | .025 | .025 | .0355 | .042 | .042 | .042 | .040 | .0485 |
| 4 | Diameter in inches of wire (bare) | .0140 | .0140 | .0140 | .0254 | .0254 | .0254 | .0254 | .0254 |
| 5 | Wire speed in ft./min | 102 | 122 | 400 | 187 | .512 | 518 | 287 | 518 |
| 6 | Rate of polymer feed in grams/min | 6.9 | 2.8 | 4.28 | 20 | 20 | 20.5 | 11.1 | 20.0 |
| 7 | Width of duct in inches | .0074 | .0074 | .0062 | .0096 | .0066 | .0063 | .0096 | .0062 |
| 8 | Thickness of coat in inches | .0055 | .002 | .001 | .005 | .0018 | .002 | .002 | .002 |
| 9 | Diameter of outer lip of duct in inches | .060 | .060 | .060 | .060 | .060 | .060 | .040 | .075 |
| 10 | Distance of plane of outer edge of outer lip of duct above or below outlet of wire guide in inches | .007 (above) | .007 (above) | .0035 (above) | .0047 (below) | .0047 (below) | .000 | .015 (below) | .0045 (above) |
| 11 | Initial radial clearance in inches between outer lip and bare wire | .023 | .023 | .023 | .0173 | .0173 | .0173 | .007 | .0248 |
| 12 | Ratio of 11 to 8 | 4.2 | 11.5 | 23.0 | 3.5 | 9.6 | 8.7 | 3.5 | 12.4 |
| 13 | Distance of quenching bath from wire exit end of extrusion head in inches | 5.0 | 5.0 | 5.0 | 5.0 | 5.0 | 5.0 | 5.0 | 5.0 |
| 14 | Coating results | Good | Good | Good | Good | Good | Good | Poor | Good |

The invention has been described with particular reference to the synthetic linear polyamides because these polymers are advantageously applied by this process, and because they yield valuable insulating coatings. The polyamide coatings are characterized by high thermal stability, excellent resistance to abrasion, good resistance to water and most organic solvents including refrigerants, and good insulating properties. These properties make the coated wire of special value in the preparation of electric blasting cap leading wires and magnet wire, e. g., for refrigerator motors. As further examples of the synthetic linear polyamides may be mentioned polydecamethylene adipamide, polydecamethylene sebacamide, poly-m-phenylene sebacamide, 6-aminocaproic acid polymer, 12 aminostearic acid polymer, as well as other polyamides and interpolyamides of the type mentioned in U. S. 2,071,253 and 2,130,948. The polyamides used should preferably have an intrinsic viscosity of at least 0.4, where intrinsic viscosity is defined as in U. S. 2,130,948.

The invention is not limited, however, to the use of synthetic linear polyamides. As examples of other insulating materials which can be applied to advantage may be mentioned polyesters, polyacetals, polyester-amides, polyurethanes, polythioureas, polymeric ethylene, unsymmetrical dichloroethylene interpolymers, vinyl resins, polymeric methyl methacrylate esters, and cellulose derivatives, particularly ethyl cellulose and benzyl cellulose. The coating materials may be modified with other substances, e. g., plasticizers, dyes, pigments, antioxidants, viscosity stabilizers, and resins, e. g. phenol-formaldehyde resins.

When the coating material is susceptible to cold drawing, as is the case with the synthetic linear polyamides, the apparatus herein described can be used to coat wire in a manner differing somewhat from that described in the foregoing examples. This modification consists in casting about the wire a circular sheath or tube of the coating composition having a larger bore than the diameter of the wire—accomplished by quenching the coating before it reaches the wire—and then passing the wire and the tubular sheath of coating through a die of such a diameter than the coating will be drawn out and reduced to the diameter of the wire. The action of the die on the coating orients the coating, thereby improving its physical properties.

For most purposes, however, the process described in the foregoing examples is preferred since it is simpler. Thus, wire coated with polyamide can be coated with a second coating of polyamide.

Further examples of wires which may be coated are tinned-copper, aluminum, iron, constantin, Nichrome, and stranded wire, such as is used in cables and in automobile wiring. Various types of yarns and bristles also can be coated. Thus, a polyamide bristle can be coated with a more water-resistant polyamide. It is not necessary that the object coated be round or smooth, or of uniform thickness.

Since the synthetic linear polyamides have unusually good physical properties, they find special application in the coating of other insulating materials which have good insulating properties but are deficient in one or more physical properties, e. g. in resistance to solvents. Thus, the application of polyamide to rubber coated wire improved the resistance of the insulation to heat, sunlight, ozone, lubricating oils, and gasoline. As examples of other insulating materials which may be coated with polyamides may be mentioned silk, rayon, cellulosic derivatives, e. g., ethyl cellulose, polystyrene, polyvinyl resins, e. g., polyvinyl acetals, and other resins. In spite of the fact that many of these materials melt or decompose at temperatures used in applying the molten polyamides, they are not appreciably affected, presumably because of the short exposure to the molten polyamide. In applying the process to coating of non-metallic surfaces subject to decomposition, it usually is desirable to quench the polyamide coating immediately after its application.

The preferred quenching medium for use in the process of this invention is water. Other nonsolvents for the coating may be applied, however. Suitable quenching liquids in the case of polyamide coatings are alcohols, glycols, ketones and chlorinated hydrocarbons. The use of an organic quenching medium generally adds to the clarity of the resultant coatings, which clarity is desirable in some instances. Optionally, dyes can be added to the quenching bath to effect dyeing of the coating on the core.

The degree of adhesion of the coating to a metallic core is dependent in large measure on the manner of application. The adhesion of the coating to the wire is greatly improved by preheating the wire. Other advantages of preheating are that it results in a smoother coating and reduces the heat loss from the extrusion head. Preferably, the wire is heated to at least 100° C., but not above the temperature of the molten insulating material. Heating to higher temperatures increases the danger of bubble formation in the coating. The preferred wire temperature in the case of polyamides lies between 150 and 285° C. Preheating is particularly advantageous in the case of large diameter wires, since it prevents excess heat loss from the extrusion head and premature solidification of the coating on the wire.

Although rapid cooling of the coated wire is desirable in all cases, it is particularly important when preheated wire is employed. The distance of the quenching bath from the point of impingement of the coating on the wire, which, in terms of the apparatus, is approximately at the wire outlet end of the extrusion head, will depend, among other things, upon the rate at which the wire is traveling. This distance usually will vary from 0.3 to 10 inches. When preheated wire is used, the quenching bath should be sufficiently near to the wire outlet end of the extrusion head for the time of travel through this distance not to exceed 0.05 second, or preferably, 0.02 second. The formation of bubbles in the coating thus is prevented.

Since certain coating compositions, including the polyamides, are subject to oxidation at elevated temperatures, it is desirable to have an atmosphere of inert gas, e. g. nitrogen, in the zone separating the extrusion head and the quenching bath.

Although the extrusion apparatus herein described is of particular advantage in applying thin coating, it is not so limited. It also may be used for the application of thick coatings, e. g. of 0.01 to 0.02 inch in thickness. Unlike extrusion apparatus having a shaping orifice, a single apparatus of the type herein described may be employed for the application of coatings of widely different thicknesses. This result is accomplished merely by varying the rate at which the polymer is fed to the wire, or the speed of the wire, or both. Thus, a single extrusion head can be used to apply coatings ranging from 0.001 to 0.010 in. in thickness, on wires of identical size. As indicated in the foregoing examples, the wire speed can be varied over a wide range. It is possible to coat wire at speeds as high as 2500 ft./min., which is greatly in excess of the speeds permitted by solvent application processes.

It is very important, particularly in the application of very thin coatings, to reduce friction between the wire and guides as much as possible. Excessive friction here manifests itself in rough and poorly centered coats. One method for overcoming this difficulty is to employ a large clearance (0.002 to 0.04 inch) between the wire and the guide (see Example V). Reduction of the land or close fitting section of the guide to the minimum practical length, is also advantageous. Lengths of 0.20 to 0.015 in. have been used but a land 0.015 to 0.03 inch long is preferred. Another method is to apply a very thin film of lubricant, e. g. oil or tricresyl phosphate, on the wire, prior to its passage through the guide. Considerable improvement can be obtained by tapering the approaches and exits to the close fit sections. When a straight taper is used an included angle of less than 25° is desirable. It is preferred, however, to use a slightly bell-mouthed taper, as indicated in Fig. 2, to make the guides of very hard materials such as diamond, or cemented metallic carbides, and to have the close fit section the same, or only slightly larger in diameter than the bare wire. This design is illustrated in Example VI, in which the principal guide was made of Carboloy (tungsten carbide). By these expedients a coat is obtained which is very smooth and practically continuous, with a clearance of 0.005 in. or less in the case of No. 22 gauge wire. When the same clearance is used with guides of hardened alloy steel, the coating is extremely rough and sometimes in the form of uniformly spaced beads due to grabbing of the wire in the guide.

It has been found advantageous in the case of tinned wire to use a cold auxiliary guide some distance above the hot extrusion head, but in many instances it is possible to dispense with an auxiliary guide altogether.

As already indicated, lubricants can be applied to the wire prior to its passage through the extrusion head. Other materials also may be applied, it being especially desirable to employ relatively thermally stable high boiling materials which are compatible to some extent with the coating. High boiling phenols and sulfonamides, e. g. octyl phenol and diamylbenzenesulfonamide, are used to advantage when the coating is a polyamide. Resins or high molecular weight organic acids, such as stearic and palmitic, also can be employed. Materials which increase the adherence of the coat to the filamentary object may be applied to the latter, prior to the coating operation, as may also antioxidants and plasticizers for the coating material. Application of such materials from solution frequently is a convenient method of obtaining them in uniform thin films.

One of the most characteristic features of the extrusion apparatus is the conical annular duct for feeding the coating composition to the core. The optimum width of the conical duct depends upon a number of factors, such as extrusion rate, the viscosity of the coating composition, diameter of the outlet mouth, and included angle made by the duct; but for most purposes a width of 0.005 to 0.011 in. is preferred. Narrower ducts have been used, even down to 0.002–0.003 inch, but in this range the pressure drop becomes excessive for practical extrusion rates. Also, very small ducts function under the disadvantage that inaccuracies in machining, such as slight departures of the male and female conical surfaces from perfect concentricity, constitute a greater percentage of the total width than is the case with ducts in the width range indicated above. Since these inaccuracies are reflected in the rate of flow of coating composition as a power function, this factor may assume considerable importance. It should be realized that optimum width of the duct varies with the extrusion rate, and that the main objective of duct design is to achieve uniform distribution of coating composition within the duct, and consequently about the core when the composition leaves the duct. To this end the above factors, as well as several others, may be varied rather widely with the different coating problems. The pressure drop through the duct should be large in comparison with that in the feeding channels.

The diameter of the outer edge of the annular mouthpiece of the duct should be at least that of the coated wire, and preferably is considerably larger. For example, diameters of 0.03 to 0.10 inch are suitable for use with No. 22 gauge wire, but a diameter of 0.05 to 0.08 inch is preferred. These ranges vary, of course, with the wire size. It is preferred that the tip or wire exit end of the principal wire guide should be close to the duct outlet so that the tubular film of coating composition will be cast directly on the wire as it issues from the guide. The distance between the bottom of this guide tip and the plane of the outer edge of the annular discharge mouth, measured along the line of wire travel, should be very small, and it is preferred to have the tip bottom and outer edge in the same plane. It is possible to obtain satisfactory results however, with the said tip even as much as 0.015 inch above or below the outer edge of the discharge mouth. In the case of especially thick coatings it may be possible to have the tip still farther back of the outer edge. For thin coats (0.004 in. and less), however, much better results are obtained if both inner and outer edges of the annular mouthpiece are in nearly the same horizontal plane, and we prefer to have the inner edge of the mouthpiece within 0.010 inch (measured along line of object travel) of the outer edge.

Where the plane of the outer lip is below that of the inner lip, the diameter of the outer lip should be appropriately enlarged, since it is a general characteristic of the invention that the contact between the issuing stream of coating material and the inside of the outer wall of the duct shall terminate before the coating material impinges on the wire. In other words, there never is any such compressive effect as would result from simultaneous compressive resistance offered by the inner surface of the outer wall of the duct and the outer surface of the wire, against a stream pressing at once against, i. e. being, in effect, squeezed between or choked by, both of said surfaces jointly and simultaneously. The coating streams employed in carrying out the process of the invention are never thick enough for such compressive effect to come into existence; and the apparatus employed in carrying out the invention is designed to facilitate the avoidance of such compressive effect. One of the more notable advantages accruing from this feature of the invention is the minimization or substantial elimination of the prior art difficulties incident to the achievement of good centering.

Although the conical tip of the principal guide and the coned hole in the head body are both shown as having been constructed with 90° included angles, this feature is not essential to the success of the invention, and the angle may be varied widely, for example over the range 30° to 180°. Similarly, the coned hole bored from the base of the extrusion head body coaxially with, and intersecting, the conical hole mentioned above, also as indicated as having been made with a 90° included angle. Equally good or better results are obtained with arrangements in which the included angle is greater, since there is less danger of extruded material flicking back and fouling the outer edge of the mouthpiece.

In the apparatus herein described, the filamentary object is drawn in a downward direction. The extrusion can be conducted horizontally, however, although in the case of heavy coats an eccentric displacement of the coat on the filamentary object may result, unless the quenching bath is very close to the extrusion head.

For synthetic linear polyamides and other crystalline polymers the extrusion temperature should be above the melting point of the polymer but below the point where decomposition becomes serious. Extrusion temperatures of 270–300° C. are most suitable in the case of polyhexamethylene adipamide. In the case of plastic materials, i. e. materials which do not have a sharp melting point but which soften to plastic masses on heating, the temperature should be high enough to allow flow of the material to and through the extrusion head without excessive pressure drop. In most cases these materials must be fed to the extrusion head with a screw pump instead of a gear pump.

The more important advantages of this invention are:

1. It makes possible the application of smooth, thin coatings of uniform thickness to filamentary objects, such as wires and threads, at much higher coating speeds than is possible by solution coating, which is the only known prior method for applying coatings of comparable thinness and smoothness. In contrast to coatings applied by solution methods, coatings applied by the present method are substantially free from pin holes.

2. Coatings of excellent concentricity with respect to the filamentary object can be achieved even with thin coats, i. e., coats less than 0.004". Heretofore it has been considered impractical to obtain such thin well-centered coats by extrusion methods. This concentricity of coating and object is effected not only for thin coats but even for relatively thick coats, without laborious precision alignment of the wire in the extrusion head. This centering is important from the standpoint of economy of coating material and of space in electrical apparatus.

3. A much wider choice of coating thicknesses is available than has been the case where conventional extrusion heads have been used.

4. Bubble-free coatings are obtained, even with coating materials which tend to develop bubbles when heated above their melting points.

5. Control of the degree of adhesion of the coating to the filamentary object is achieved, through adjustment of the temperature of the wire just prior to coating, or of the distance between the wire-exit and the quench bath.

6. Not only metallic filamentary objects, but also filamentary objects having surfaces which are non-metallic, or subject to thermal decomposition at the extrusion temperatures employed, may be coated successfully, in accordance with the invention.

The invention is of special utility in the application of insulating coatings to electrical conductors for various uses, for example, dynamoelectric machines, refrigerator motors, radio hook ups and aerials, high tension and telephone cables, generator coils, radio, telephone and telegraph coils, transformers, slot insulation in motors, ignition wire, and telephone switchboards. The invention is particularly useful in the making of magnet wire, i. e., insulated wire used generally in the form of coils for the purpose of interchange of electric and magnetic energy. The invention also is useful in coating other filamentary objects, such as cotton, silk, bristles, or the like, for the purpose of varying their properties.

Since many apparently widely different embodiments of this invention may be made without departing from the spirit thereof, it is to be understood that we do not limit ourselves to the specific embodiments thereof except as defined in the appended claims.

We claim:

1. Extrusion coating apparatus of the kind wherein heated coating material is fed to a heated extrusion head through which a core to be coated is passed in the direction of the longitudinal axis of the core, which said apparatus comprises, in combination, means for depositing coating material uniformly and concentrically about the core, and means for maintaining the core centered; said first mentioned means comprising an annular duct converging to form an annular mouth, the said mouth comprising an outer annular lip and an inner annular lip, the former being substantially farther removed from the axis of the core than the latter, and said mouth constituting the final structure for distributing coating material about the core; said second mentioned means comprising a guide located adjacent to the said mouth, the said lips and the said guide being concentrically disposed with respect to each other, and the said lips being essentially in the same plane with the core-exit end of said guide.

2. Extrusion coating apparatus of the kind wherein heated coating material is fed to a heated extrusion head through which a core to be coated is passed in the direction of the longitudinal axis of the core, which said apparatus comprises, in combination, means for depositing coating material uniformly and concentrically about the core, and means for maintaining the core centered; said first mentioned means comprising an annular header disposed concentrically about a straight line defined by and passing through the center of the hereinafter mentioned mouth and the center of the hereinafter mentioned guide, said header leading into a set of ducts of substantially uniform size concentrically arranged about the said line, having their longitudinal axes substantially equidistant therefrom and parallel therewith, the said ducts leading into an annular recess likewise concentrically disposed about the said line, and said annular recess leading into an annular duct converging to form an annular mouth, the said duct being of uniform width between its walls at all points on either inside wall surface equidistantly located from the center of the said mouth, and the said mouth comprising an outer annular lip and an inner annular lip, the former being substantially farther removed from the axis of the core than the latter, said lips being approximately in the same plane, and said mouth constituting the final structure for distributing coating material about the core; said second mentioned means comprising a guide located adjacent to the said plane, the said lips and the said guide being concentrically disposed with respect to each other, and the said lips being essentially in the same plane with the core-exit end of said guide.

3. In an apparatus for depositing a uniform, well-centered coating upon a substantially wire-shaped core, a core guide and a conical annular duct for carrying the coating material to the core, said duct terminating in an annular mouth whose outer lip is substantially farther removed from the path of the core than its inner lip, said inner and outer lips being essentially in the same plane with the core-exit end of said guide and being concentrically disposed with respect thereto.

4. The apparatus set forth in claim 3 wherein the conical duct is 0.005" to 0.011" in width.

5. The apparatus set forth in claim 1 in which the smallest diameter of said guide has a radial clearance of at least 0.002 inch with respect to the core to be coated.

JOSEPH H. BALTHIS.
ARTHUR W. LARCHAR.